(12) United States Patent
Miyako

(10) Patent No.: US 11,814,916 B2
(45) Date of Patent: Nov. 14, 2023

(54) CORE BARREL HEAD, INNER TUBE ASSEMBLY PROVIDED WITH SAME, AND INNER TUBE RECOVERY METHOD

(71) Applicant: Shigeru Miyako, Sapporo (JP)

(72) Inventor: Shigeru Miyako, Sapporo (JP)

( * ) Notice: Subject to any disclaimer, the term of this patent is extended or adjusted under 35 U.S.C. 154(b) by 30 days.

(21) Appl. No.: 17/757,160

(22) PCT Filed: Dec. 16, 2020

(86) PCT No.: PCT/JP2020/046990
§ 371 (c)(1),
(2) Date: Jun. 10, 2022

(87) PCT Pub. No.: WO2021/125230
PCT Pub. Date: Jun. 24, 2021

(65) Prior Publication Data
US 2022/0412177 A1    Dec. 29, 2022

(30) Foreign Application Priority Data

Dec. 18, 2019    (JP) .................................. 2019-228390

(51) Int. Cl.
*E21B 25/02*    (2006.01)
*E02D 1/04*    (2006.01)
*G01N 1/08*    (2006.01)

(52) U.S. Cl.
CPC ................ *E21B 25/02* (2013.01); *E02D 1/04* (2013.01); *G01N 1/08* (2013.01)

(58) Field of Classification Search
CPC ............ E21B 25/00; E21B 25/02; E02D 1/04
See application file for complete search history.

(56) References Cited

U.S. PATENT DOCUMENTS

| 3,667,558 A * | 6/1972 | Lambot .................. E21B 25/02 |
| | | 175/246 |
| 4,834,198 A * | 5/1989 | Thompson .............. E21B 23/08 |
| | | 175/244 |

(Continued)

FOREIGN PATENT DOCUMENTS

| AU | 2016282274 A1 * | 2/2018 | ............. E21B 25/02 |
| AU | 2018452022 A1 * | 6/2021 | ............. E21B 10/02 |

(Continued)

*Primary Examiner* — Frederick L Lagman
(74) *Attorney, Agent, or Firm* — Muncy, Geissler, Olds & Lowe, P.C.

(57) ABSTRACT

[Problem] To provide: a core barrel head capable of definitely recovering an inner tube in which a geological sample has been collected in a situation where excavation is performed in a horizontal direction and in a rising gradient direction; an inner tube assembly provided with said core barrel head; and an inner tube recovery method.
[Solution] The present invention has: a main shaft 31 connected to the rear end of an inner tube 2; an inner fixing latch 32 that is axially supported at a substantially intermediate position along an axial direction of the main shaft 31; a latch disengagement slide tube 33 that is mounted to the outer circumferential surface of the main shaft 31 slidably in the axial direction and that disengages the inner fixing latch 32 from a locking groove 43 by inclining the inner fixing latch 32 against a biasing force; and a slide tube fixing latch 34 that locks the latch disengagement slide tube 33 at a position where the inner fixing latch 31 is in an expansion state and that disengages the lock of the latch disengagement slide tube 33 by being inclined by an overshot.

5 Claims, 5 Drawing Sheets

(56) References Cited

U.S. PATENT DOCUMENTS

| | | | | |
|---|---|---|---|---|
| 5,267,620 A * | 12/1993 | Lee | ............ | E21B 23/02 |
| | | | | 175/246 |
| 5,601,152 A * | 2/1997 | Harrison | ............ | E21B 25/02 |
| | | | | 175/246 |
| 6,089,335 A * | 7/2000 | Able | ............ | E21B 25/02 |
| | | | | 175/246 |
| 9,644,439 B2 * | 5/2017 | Lambert | ............ | E21B 34/06 |
| 2014/0174828 A1 * | 6/2014 | Muntz | ............ | E21B 25/02 |
| | | | | 175/246 |
| 2016/0017672 A1 * | 1/2016 | Back | ............ | E21B 31/18 |
| | | | | 166/242.6 |
| 2016/0017677 A1 * | 1/2016 | Back | ............ | E21B 34/10 |
| | | | | 175/57 |

FOREIGN PATENT DOCUMENTS

| | | | |
|---|---|---|---|
| JP | H11-61793 A | | 3/1999 |
| JP | 11256974 A | * | 9/1999 |
| JP | 2002242579 A | * | 8/2002 |

\* cited by examiner

CORE BARREL HEAD, INNER TUBE ASSEMBLY PROVIDED WITH SAME, AND INNER TUBE RECOVERY METHOD

TECHNICAL FIELD

The present invention relates to a core barrel head for use in collecting geological samples by a geological sampling device, an inner tube assembly provided with the same, and an inner tube recovery method.

BACKGROUND ART

In tunnel constructions, geographical samples are collected to conduct geological surveys related to the amount of heavy metals, etc., contained in the underground soil before a full-scale excavation work is performed. The soils containing a large amount of heavy metals need to be treated as industrial wastes. Since the geological surveys make it possible to perform advance preparation, a smooth excavation work can be carried out.

A double tube excavator has conventionally been used as a device for collecting geological samples. The double-tube geological sampling device is used to excavate the underground soil by rotating an outer tube called an outer tube assembly, which has an excavation bit provided at its front end. The outer tube incorporates, at its front end position, an inner tube to collect a geological sample, so that the geological sample (dirt, sands, gravels, rocks, etc.) excavated by the outer tube is taken in and collected through a collection port. The inner tube in which a geological sample has been collected is then connected to an overshot having a wire, the overshot being pressed into the outer tube by water pressure. The inner tube is pulled out by the wire so as to be recovered. In this case, the rear end of the inner tube is connected to a core barrel head, which is removably held in the outer tube and is connected to the overshot at the time of recovery. A configuration of the inner tube connected the core barrel head is referred to as an inner tube assembly.

Inventions related to the core barrel head have been proposed so far. For example, Japanese Patent Laid-Open No. 11-61793 discloses an invention relating to a core barrel head having a latch that engages with a locking groove formed on an inner wall surface of an outer tube (Patent Literature 1). According to Patent Literature 1, at the time of recovery of an inner tube, a wire is used to pull the inner tube toward an inlet port such that the latch is disengaged from the locking groove, and thereby the inner tube can be recovered.

CITATION LIST

Patent Literature

Patent Literature 1: Japanese Patent Laid-Open No. 11-61793

SUMMARY OF INVENTION

Technical Problem

However, the invention disclosed in Patent Literature 1 has been developed mainly for use in collecting underground geological samples. Accordingly, the invention has a structure capable of disengaging the latch by using gravity applied to the core barrel head and the inner tube when the inner tube is pulled up for recovery. Therefore, when excavation is performed in a horizontal direction and a rising gradient direction, as in the case of geological surveys for tunneling constructions, gravity may be unavailable for disengaging the latch.

Moreover, the conventional overshot is inserted into the outer tube, which is removed from the geological sampling device, and is pressed in by water pressure provided by a water swivel installed at the inlet side of the outer tube. However, when the outer tube is removed from the geological sampling device and is applied with water pressure without rotation, it may be difficult to press the overshot into the outer tube since there is no escape available place for water.

When it is difficult to recover the inner tube as described above, it is necessary to pull out the inner tube together with the outer tube, and this may cause a delay in construction period and an increase in construction costs. Therefore, there are needs for developing a new core barrel head that can reliably recover the inner tube even when excavation is performed in the horizontal direction and in the rising gradient direction.

The present invention has been made in response to the needs as described above, and it is an object of the present invention to provide a core barrel head capable of reliably recovering an inner tube in which a geological sample has been collected in a situation where excavation is performed in a horizontal direction and in a rising gradient direction, an inner tube assembly provided with the same, and an inner tube recovery method.

Solution to Problem

In order to accomplish the object of reliably recovering the inner tube during excavation in the horizontal direction and in the rising gradient direction, the core barrel head according to the present invention is a core barrel head that removably holds an inner tube at a front end position inside an outer tube in a geological sampling device configured to collect a geological sample. The core barrel head includes: a main shaft connected to a rear end of the inner tube; an inner fixing latch that is axially supported at a substantially middle position along an axial direction of the main shaft and that is expanded outward of the main shaft by a biasing force of an elastic material so as to engage with a locking groove formed on an inner wall surface of the outer tube; a latch disengagement slide tube that is mounted on an outer circumferential surface of the main shaft slidably in the axial direction and that disengages the inner fixing latch from the locking groove by inclining the inner fixing latch against the biasing force when the latch disengagement slide tube is slid in a front end direction of the main shaft; and a slide tube fixing latch that is axially supported by a rear end side of the main shaft and that is expanded outward of the main shaft by the biasing force of the elastic material so as to lock the latch disengagement slide tube at a position where the inner fixing latch is in an expansion state, the slide tube fixing latch also being configured to disengage the lock of the latch disengagement slide tube by being inclined by an overshot that is pressed into the outer tube.

In one aspect of the present invention, in order to accomplish an object of preventing unintentional inclination of the inner fixing latch, the latch disengagement slide tube may be integrally connected to a latch inclination preventing part that prevents inclination of the inner fixing latch. The latch inclination preventing part may prevent inclination of the inner fixing latch by coming into contact with an inner side of the inner fixing latch when the inner fixing latch is in the expansion state. The latch inclination preventing part may move in conjunction with a sliding motion of the latch disengagement slide tube in the front end direction so as to release the contact with the inner fixing latch when the inner fixing latch is inclined.

Furthermore, in an aspect of the present invention, in order to accomplish an object of reliably fixing the inner tube at the front end position inside the outer tube and preventing unintentional inclination of the inner fixing latch, the core barrel head may include a sliding tube biasing member that biases the latch disengagement slide tube in a rear end direction with respect to the main shaft.

In order to accomplish the object of reliably recovering the inner tube during excavation in the horizontal direction and in the rising gradient direction, an inner tube assembly according to the present invention includes: the core barrel head; and an inner tube that is removably connected to a front end portion of the core barrel head.

In order to accomplish the object of reliably recovering the inner tube during excavation in the horizontal direction and in the rising gradient direction, an inner tube recovery method according to the present invention is a recovery method of the inner tube in which a geological sample has been collected. The method includes: a slide tube fixing latch release step of releasing an engaged state with a latch disengagement slide tube by pressing an overshot into an outer tube and inclining a slide tube fixing latch of a core barrel head at a front end position inside the outer tube; a latch inclination preventing part release step of releasing a contact state of the latch inclination preventing part with an inner fixing latch by pushing the latch disengagement slide tube that is released from the engaged state toward a front end side and sliding the latch disengagement slide tube toward the axially front end side along an outer circumferential surface of a main shaft so as to move the latch inclination preventing part toward the axially front end side; an inner fixing latch disengagement step of disengaging the inner fixing latch from a locking groove formed on an inner wall surface of the outer tube by inclining the inner fixing latch in an inward direction against a biasing force by the latch disengagement slide tube that is slid; and an inner tube recovery step of recovering the inner tube connected to a front end of the core barrel head by connecting the overshot to a rear end portion of the core barrel head and pumping the inner tube out by water pressure of underground water that enters into the outer tube, or by pulling the inner tube out with a wire connected to the overshot.

Advantageous Effects of Invention

The present invention makes it possible to reliably recover the inner tube in which a geological sample has been collected even in a situation where excavation is performed in a horizontal direction and in a rising gradient direction to collect the geological sample.

DESCRIPTION OF EMBODIMENTS

Hereinafter, embodiments of a core barrel head, an inner tube assembly and an inner tube recovery method according to the present invention will be described with reference to the drawings.

Figure 1:
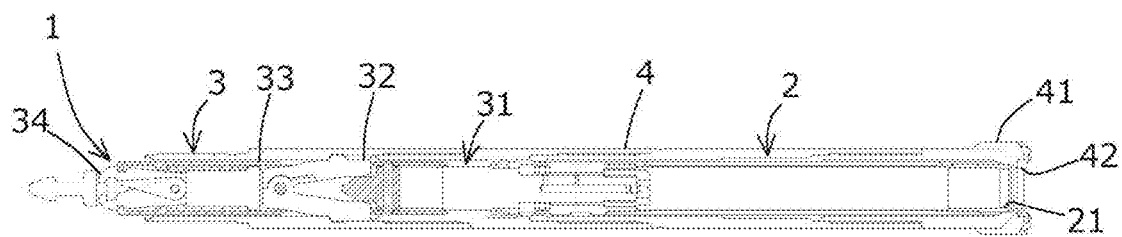
FIG. 1 is a longitudinal section view showing an inner tube assembly according to the present invention in the state of being held at a front end position of an outer tube.
Figure 2:
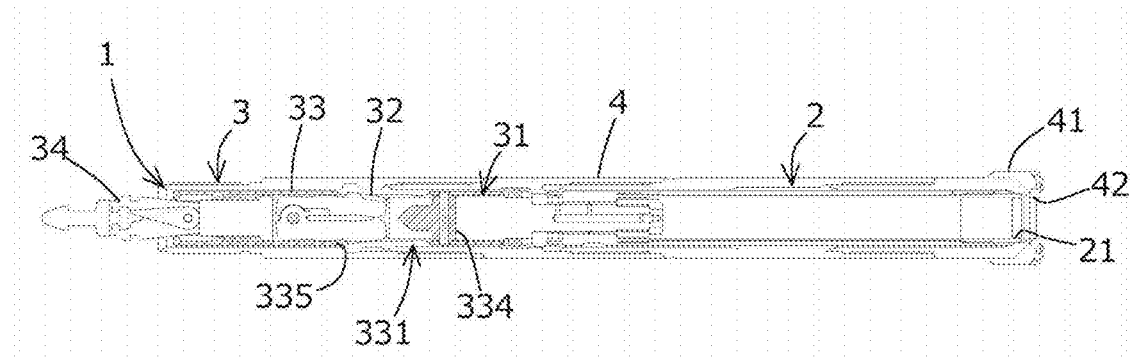
FIG. 2 is a longitudinal section view of the inner tube assembly of a present embodiment released from the state of being held at the front end position of the outer tube.

An inner tube assembly 1 of the present embodiment is configured of an inner tube 2 that collects a geological sample, and a core barrel head 3 that is connected to the rear end of the inner tube 2 as shown in FIGS. 1 and 2.

The inner tube 2 is a member formed in a tube shape to collect a geological sample (dirt, sands, gravels, rocks, etc.). At the front end of the inner tube 2, a collection port 21 is open. The collection port 21 is installed so as to communicate with a collection port 42 of an excavation bit 41, so that a geological sample that enters therein is collected.

The core barrel head 3 is configured to removably hold the inner tube 2 at a front end position inside the outer tube 4. In the present embodiment, the core barrel head 3 includes, as shown in FIGS. 1 to 4, a main shaft 31 connected to the rear end of the inner tube 2, an inner fixing latch 32 provided in a substantially middle position of the main shaft 31, a latch disengagement slide tube 33 that inclines the inner fixing latch 32, and a slide tube fixing latch 34 that fixes the latch disengagement slide tube 33 to the main shaft 31 in an engageable and disengageable manner.

Figure 3:
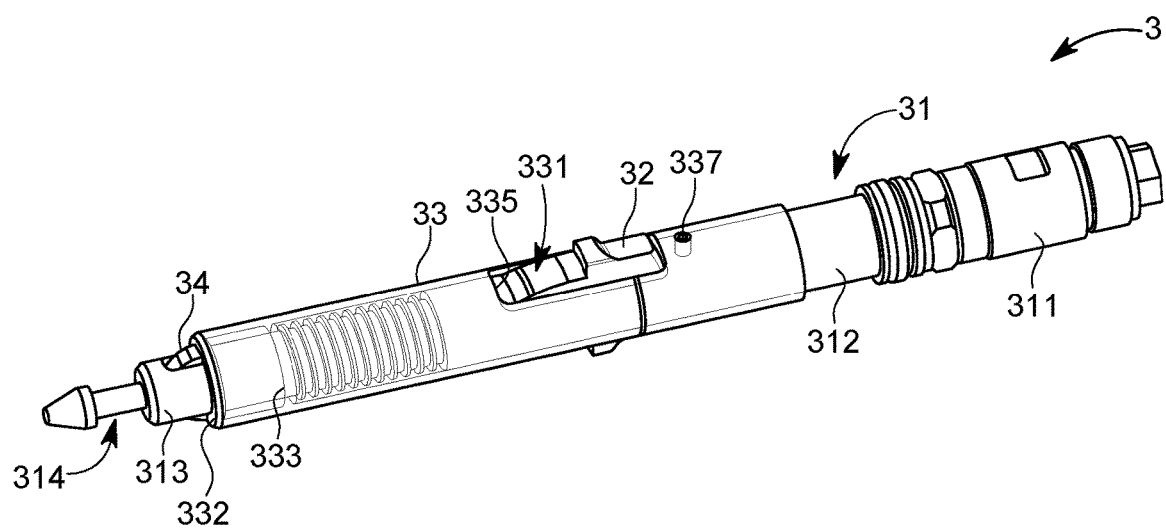
FIG. 3 is a perspective view of a translucent representation of a latch disengagement slide tube in one embodiment of the core barrel head according to the present invention.
Figure 4:
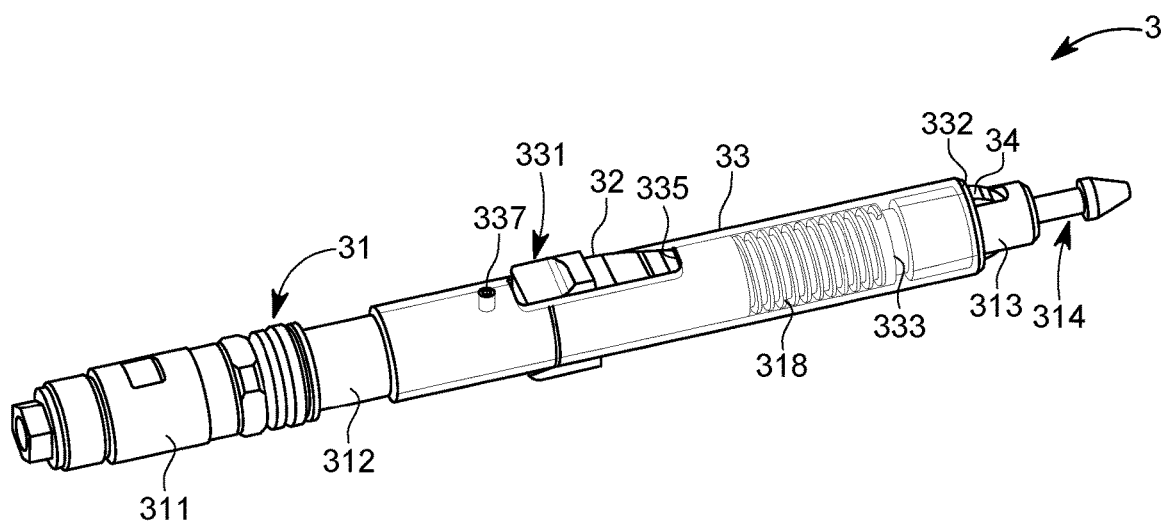
FIG. 4 is a perspective view showing the core barrel head of FIG. 3 as viewed from a front end side.

As shown in FIGS. 3 and 4, the main shaft 31 is a member formed into a substantially cylindrical shape. The main shaft 31 includes, in order from the front end, a tube connection part 311 for connecting the inner tube 2, a front-end shaft part 312 connected to the tube connection part 311, a rear-end shaft part 313 formed to be narrower at the rear end side of the front-end shaft part 312, and an engagement part 314 extending rearward from the rear-end shaft part 313.

Figure 5:
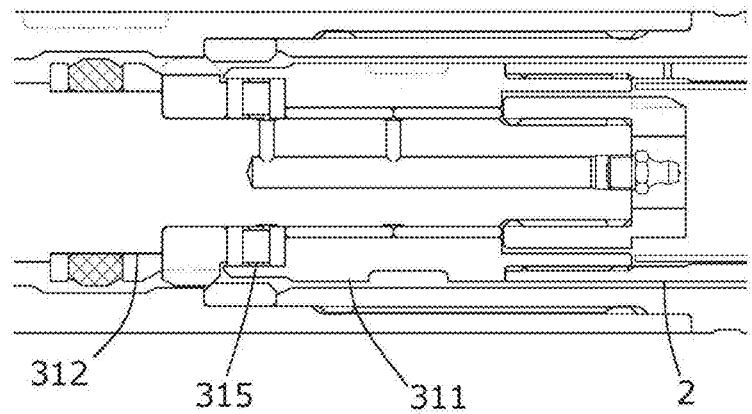
FIG. 5 is an expanded sectional view showing a connection portion between the inner tube and the core barrel head in FIG. 1.

The tube connection part 311 is configured to fit and connect to the rear end of the inner tube 2. In the present embodiment, a bearing 315 is provided between the tube connection part 311 and the front-end shaft part 312 so as to rotatably support the inner tube 2 as shown in FIG. 5.

Figure 6:
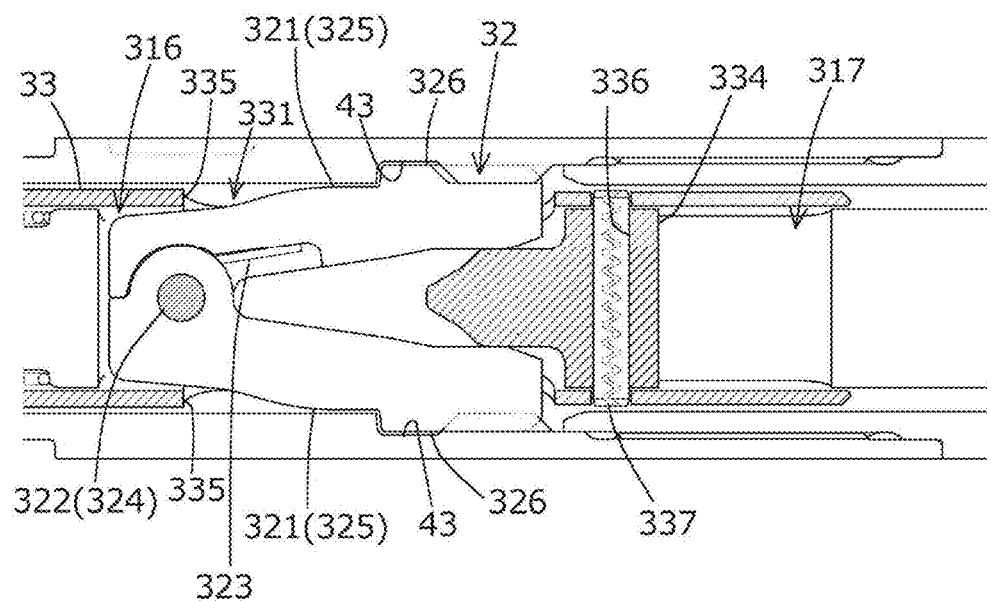
FIG. 6 is an expanded sectional view showing a front-end shaft part (an installation portion of the inner fixing latch and a latch inclination preventing part) in FIG. 1.
Figure 7:
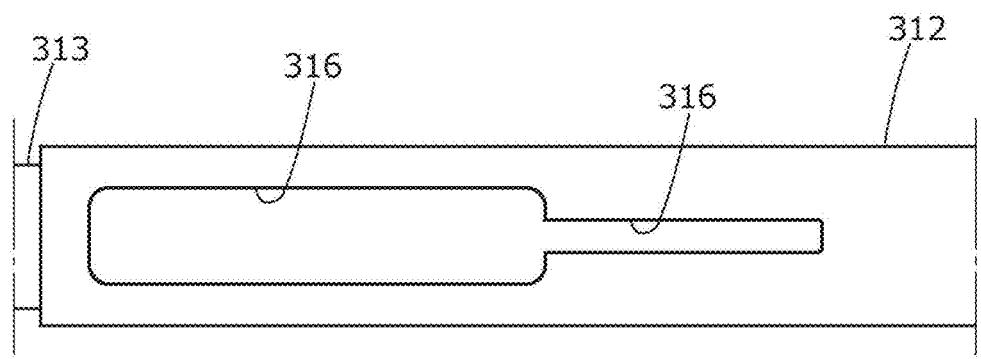
FIG. 7 is an enlarged plan view showing part of the front-end shaft portion in the present embodiment.

The front-end shaft part 312 is the portion where the inner fixing latch 32 and the latch inclination preventing part 334 are installed as shown in FIGS. 6 and 7. At a substantially middle position of the front-end shaft part 312, a first latch housing hole 316 that houses the inner fixing latch 32, and an inclination preventing part housing hole 317 that houses the latch inclination preventing part 334 are formed.

The first latch housing hole 316 is a hole that houses the inner fixing latch 32. The first latch housing hole 316 in the present embodiment is formed as a hole that extends in an upper and lower direction such that the inner fixing latch 32 can be expanded outward of the main shaft 31.

The inclination preventing part housing hole 317 is a hole that houses the latch inclination preventing part 334 and that allows the latch inclination preventing part 334 to slide along the axial direction. The inclination preventing part housing hole 317 is formed to communicate with the front end side of the first latch housing hole 316. The inclination preventing part housing hole 317 is also formed as a hole that extends in the upper and lower direction to integrally connect the latch inclination preventing part 334 with the latch disengagement slide tube 33.

Figure 8:
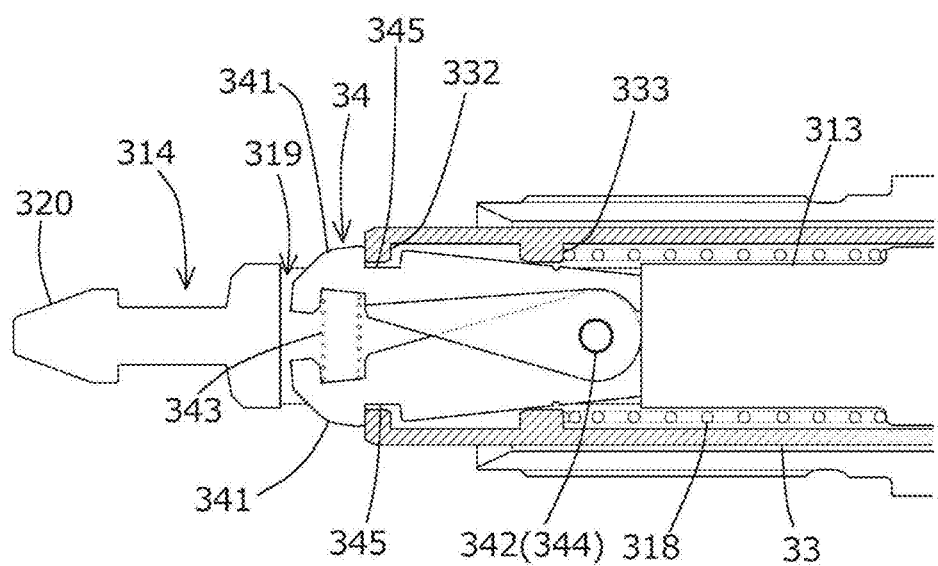
FIG. 8 is an enlarged sectional view showing a rear-end shaft part (an installation portion of a sliding tube biasing member and a slide tube fixing latch) and an engaging part in FIG. 1.
Figure 9:
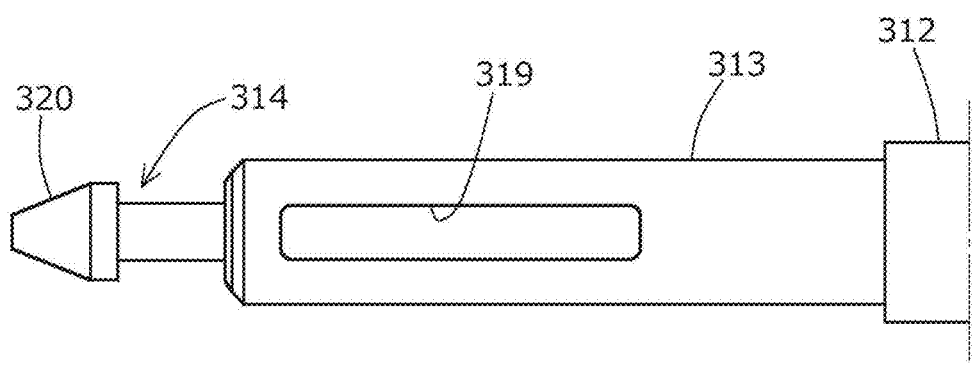
FIG. 9 is an enlarged plan view showing the rear-end shaft part and an engaged part in the present embodiment.

As shown in FIGS. 8 and 9, the rear-end shaft part 313 is mounted with a sliding tube biasing member 318 and also houses the slide tube fixing latch 34. The rear-end shaft part 313 in the present embodiment is formed narrower than the outer diameter of the front-end shaft part 312. A step formed between the rear-end shaft part 313 and the front-end shaft part 312 can lock the front end side of the sliding tube biasing member 318, which is made of a compression spring.

The rear-end shaft part 313 also has a second latch housing hole 319 that houses the slide tube fixing latch 34. The second latch housing hole 319 is formed as a hole that extends in the upper and lower direction and that is longer in the axial direction at the position that is at a rear end side of the sliding tube biasing member 318 that is to be mounted.

The engagement part 314 is a portion that is connected to an overshot when the inner tube 2 is recovered. The engagement part 314 extends rearward from a rear end axial core position of the rear-end shaft part 313. At the rear end portion, an engagement protruding part 320 is formed to engage with the overshot that bulges in a conical shape.

The front-end shaft part 312, the rear-end shaft part 313 and the engagement part 314 in the main shaft 31 may be formed integrally by cutting machining, etc., or may be formed separately as a plurality of members and be assembled into an integral configuration.

The inner fixing latch 32 engages with a locking groove 43 formed on the inner wall surface of the outer tube 4. As shown in FIG. 6, the inner fixing latch 32 is housed in the first latch housing hole 316 that is open at a substantially middle position along the axial direction of the main shaft 31. The inner fixing latch 32 in the present embodiment includes a pair of upper and lower arm members with a claw 321, 321, a support shaft 322 that axially supports one end portion of the pair of arm members with a claw 321, 321, and an elastic material 323 that expands the other end portion of the pair of arm members with a claw 321, 321 in an outward direction.

The arm members with a claw 321 are rod-like members longer in the axial direction. The arm members with a claw 321 include a shaft hole 324 formed at the rear end side to allow insertion of the support shaft 322, and engagement claw parts 326 formed in a protruding shape on outer surfaces 325 (the surface of the main shaft 31 facing outside). The engagement claw parts 326 are formed into a shape that can engage with the locking groove 43 formed on the inner wall surface of the outer tube 4. The outer surface 325 is curvedly formed at a mild inclination angle from the rear end side to the engagement claw parts 326 so as to be easily inclined by the latch disengagement slide tube 33.

The support shaft 322 axially supports the pair of upper and lower arm members with a claw 321, 321. In the present embodiment, the support shaft 322 is configured of a bolt that is inserted through the shaft hole 324 formed on the rear end side of the arm member with a claw 321 and through a shaft insertion hole (not shown) formed on the main shaft 31, and a nut to screw the bolt. The support shaft 322 is not limited to the configuration of the bolt and the nut, but may be selected from axially supportable members, such as cylindrical plate springs, as appropriate.

The elastic material 323 is an elastic material for exerting a biasing force that expands the pair of upper and lower arm members with a claw 321, 321 axially supported by the support shaft 322, in the outward direction (upper and lower direction in FIGS. 1 and 2). In the present embodiment, a torsional coil spring formed by annularly winding a wire along the support shaft 322 is used. The elastic material 323 is not limited to the torsional coil springs, but may be selected from other spring materials, such as compression coil springs, or other elastic materials, such as rubber, as appropriate.

The latch disengagement slide tube 33 disengages the engagement claw parts 326 from the locking groove 43 by inclining the inner fixing latch 32 against the biasing force. The latch disengagement slide tube 33 is mounted to the outer circumferential surface of the main shaft 31 slidably in the axial direction. The latch disengagement slide tube 33 in the present embodiment is configured as a long-length circular tube having an internal diameter that is substantially identical to the outer diameter of the front-end shaft part 312 of the main shaft 31 as shown in FIG. 6.

As shown in FIGS. 3, 4, and 6, the latch disengagement slide tube 33 includes an inclination hole 331 extending in an upper and lower direction in a substantially middle position, and a locking protrusion part 332 that is formed in a ring shape on the rear end inner circumferential surface, a biasing member locking protrusion part 333 formed in a ring shape on the inner circumferential surface at the front end side of the locking protrusion part 332, and the latch inclination preventing part 334 integrally connected thereto.

The inclination hole 331 is a hole open to allow expansion of the inner fixing latch 32 and to incline the inner fixing latch 32 with use of a rear end edge portion 335 of the inclination hole 331. The inclination hole 331 in the present embodiment is open on both upper and lower sides with an opening dimension similar to that of the first latch housing hole 316.

The locking protrusion part 332 is locked by the slide tube fixing latch 34. The locking protrusion part 332 is formed in a ring-like protruding shape on the rear end inner circumferential surface of the latch disengagement slide tube 33. The locking protrusion part 332 in the present embodiment is formed in a ring shape having an internal diameter substantially identical to the outer diameter of the rear-end shaft part 313 as shown in FIG. 8.

The biasing member locking protrusion part 333 is a protrusion for locking the rear end side of the sliding tube biasing member 318 mounted on the rear-end shaft part 313. The biasing member locking protrusion part 333 is formed in a ring-like protruding shape on the inner circumferential surface of the latch disengagement slide tube 33. The biasing member locking protrusion part 333 in the present embodiment is formed on the front end side of the locking protrusion part 332, and formed in a ring shape having an internal diameter substantially identical to the outer diameter of the rear-end shaft part 313.

The latch inclination preventing part 334 prevents unintentional inclination of the inner fixing latch 32 during collection of a geological sample. The latch inclination preventing part 334 in the present embodiment has a top-to-bottom width formed to be equal to a width corresponding to a gap between the upper arm member 321 and the lower arm member 321 of the inner fixing latch 32 in an expansion state, and is formed to be tapered toward the rear end side as shown in FIG. 6. At the front end side of the latch inclination preventing part 334, a connecting hole 336 for integral connection with the latch disengagement slide tube 33 is formed so as to extend in the upper and lower direction. In the present embodiment, the latch inclination preventing part 334 is integrally connected with the latch disengagement slide tube 33 using a plate spring 337 formed in a cylindrical shape.

The slide tube fixing latch 34 is a latch for fixing the latch disengagement slide tube 33 to the main shaft 31 in an engageable and disengageable manner. The slide tube fixing latch 34 in the present embodiment includes, as shown in FIG. 8, a pair of upper and lower arm members with a groove 341, 341 having an engagement recess groove part 345 that fixes the latch disengagement slide tube 33, a support shaft 342 that axially supports one end portion of the pair of arm members with a groove 341, 341, and an elastic material 343 that expands the other end portion of the pair of arm members with a groove 341, 341 in an outward direction.

The arm member with a groove 341 is a rod-like member long in the axial direction. The arm member with a groove 341 includes a shaft hole 344 that allows insertion of the support shaft 342 formed at the front end side, and the engagement recess groove part 345 formed in a recessed groove shape that can be engaged with the locking protrusion part 332 formed on the rear end inner surface of the latch disengagement slide tube 33. The outer surfaces (upper and lower surfaces) at the rear end side of the engagement recess groove part 345 are formed in a curved shape so as to have a reduced diameter in a side view for the purpose of being easily inclined by the front end of the overshot.

The support shaft 342 axially supports the pair of upper and lower arm members with a groove 341, 341. In the present embodiment, the support shaft 342 is configured of a bolt and a nut as in the case of the support shaft 322 of the inner fixing latch 32. The support shaft 342 is not limited to the configuration of the bolt and the nut, but may be selected from axially supportable members, such as cylindrical plate springs.

The elastic material 343 is an elastic material for exerting a biasing force that expands the pair of upper and lower arm members with a groove 341, 341 axially supported by the support shaft 342, in the outward direction. In the present embodiment, the elastic material 343 is configured of a compression coil spring. The elastic material 343 of the slide tube fixing latch 34 is not limited to the compression coil spring, but may be selected from, for example, torsional coil springs similar to that of the elastic material 323 of the inner fixing latch 32, other spring materials, or other elastic materials, such as rubber, as appropriate.

As shown in FIGS. 1, 8 and 9, the slide tube fixing latch 34 is housed in the second latch housing hole 319 such that the latch disengagement slide tube 33 is locked at the position where the inner fixing latch 32 is in the expansion state. In this case, the latch disengagement slide tube 33 is fixed with enough space between the latch disengagement slide tube 33 and the tube connection part 311 so as to be slidable toward the front end side as shown in FIGS. 3 and 4.

Description is now given of the effects of each component in the core barrel head 3 and the inner tube assembly 1 of the present embodiment, along with the inner tube recovery method.

First, the inner tube assembly 1 is mounted at the front end position inside the outer tube 4. Specifically, as shown in FIG. 2, the latch inclination preventing part 334 is moved to the front end side integrally with the latch disengagement slide tube 33 so that the inner fixing latch 32 can be inclined. With the rear end edge portion 335 of the inclination hole 331, the inner fixing latch 32 is inclined so that the top-to-bottom width is small enough to be insertable into the outer tube 4. Then, the inner tube assembly 1 is inserted into the outer tube 4. Water is fed from the rear side into the inserted inner tube assembly 1 to move the inner tube assembly 1 to the front end side within the outer tube 4 by water pressure.

When the inner tube assembly 1 reaches the front end position inside the outer tube 4, the inner fixing latch 32 of the core barrel head 3 expands and engages into the locking groove 43 formed on the inner wall surface of the outer tube 4 as shown in FIG. 1. Specifically, as shown in FIG. 6, the latch disengagement slide tube 33 slides toward the rear end side by a biasing force of the sliding tube biasing member 318, and the arm members with a claw 321 expand outward of the main shaft 31 by the biasing force of the elastic material 323. As a result, the engagement claw parts 326 fit into the locking groove 43 and the core barrel head 3 is fixed to the outer tube 4.

The geological sampling device sends the outer tube 4 to the underground soil while rotating the outer tube 4 to collect a geological sample. Water is fed into the outer tube 4 as necessary. Then, when the excavation bit 41 provided at the front end of the outer tube 4 excavates the underground soil, an excavated geological sample flows in through the collection ports 21, 42, and is collected into the inner tube 2.

Next, the inner tube 2 in which the geological sample has been collected is recovered. The inner tube recovery method of the present embodiment includes: a slide tube fixing latch release step of releasing an engaged state of the slide tube fixing latch 34 with the latch disengagement slide tube 33 by inclining the slide tube fixing latch 34; a latch inclination preventing part release step of releasing a contact state of the latch inclination preventing part 334 with the inner fixing latch 32 by moving the latch inclination preventing part 334 toward the axially front end side; an inner fixing latch disengagement step of disengaging the inner fixing latch 32 from the locking groove 43 of the outer tube 4; and an inner tube recovery step of recovering the inner tube 2 that is connected to the front end of the core barrel head 3.

In the slide tube fixing latch release step, the overshot is first pressed into the outer tube 4. In the present embodiment, after the overshot is inserted into the outer tube 4, water is fed from behind the overshot so as to press the overshot into the front end side by water pressure. In this case, the water pressure of the water supplied by the geological sampling device can be used without mounting a water swivel. Hence, the outer tube 4 can be pressed in while the outer tube 4 is rotated as in the case of excavation. As a result, an appropriate gap is created between the outer tube 4 and the underground soil as an escape route of the water, so that the overshot can be pressed in smoothly.

The cylindrical front end of the overshot which has been pressed in is fit into the rear end side of the slide tube fixing latch 34. Accordingly, the arm members with a groove 341 of the slide tube fixing latch 34 are pushed inward by the front end edge portion of the overshot, and be inclined inward against a biasing force of the elastic material 343. In this case, since the rear end side of the arm members with a groove 341 are curved, the arm members with a groove 341 can be inclined smoothly. By inclining the slide tube fixing latch 34, the engagement recess groove part 345 is detached from the locking protrusion part 332 of the latch disengagement slide tube 33. In other words, the engaged state between the slide tube fixing latch 34 and the latch disengagement slide tube 33 is released. This allows the latch disengagement slide tube 33 to slide in the front end direction.

Next, in the latch inclination preventing part release step, the contact state of the latch disengagement slide tube 33 with the inner fixing latch 32 is released by pushing the latch disengagement slide tube 33 that is released from the engaged state toward the front end side and sliding the latch disengagement slide tube 33 toward the axially front end side along the outer circumferential surface of the main shaft 31 so as to move the latch inclination preventing part 334 toward the axially front end side.

Specifically, the latch disengagement slide tube 33 is pushed toward the front end side together with the overshot by water pressure. Since the latch inclination preventing part 334 in the present embodiment is integrally connected to the latch disengagement slide tube 33, the latch inclination preventing part 334 automatically moves to the axially front end side. As a result, the latch inclination preventing part 334 moves from between the arm members with a claw 321, 321 in the inner fixing latch 32 to the front end side, so that the contact state with the inner fixing latch 32 is released.

Next, in the inner fixing latch disengagement step, the inner fixing latch 32 is disengaged from the locking groove 43 of the outer tube 4 by inclining the inner fixing latch 32 in an inward direction against a biasing force by the latch disengagement slide tube 33 that is to be slid. In the present embodiment, the inner fixing latch 32 is inclined by the rear end edge portion 335 of the inclination hole 331 in the latch disengagement slide tube 33. As a result, the arm members with a claw 321 are inclined in the inward direction, so that the engagement claw parts 326 are disengaged from the locking groove 43 of the outer tube 4 as shown in FIG. 2. Since the outer surfaces 325 of the arm members with a claw 321 in the latch disengagement slide tube 33 are gently inclined from the rear end side to the engagement claw parts 326, smooth inclination of the arm members with a claw 321 is achieved. This allows the inner tube assembly 1 to move within the outer tube 4 without requiring an operation of pulling the inner tube assembly 1 to the side of an insertion port of the outer tube 4.

In a subsequent inner tube recovery step, the inner tube 2 connected to the front end of the core barrel head 3 is recovered by connecting the overshot to the rear end portion of the core barrel head 3 and pumping the inner tube out by water pressure of underground water that enters into the outer tube 4, or by pulling the inner tube 2 out with a wire connected to the overshot. In the present embodiment, although not shown in the drawings, the overshot that has pushed the latch disengagement slide tube 33 toward the front end side is locked and connected to the engagement protruding part 320 of the engagement part 314 in the core barrel head 3.

In the case of receiving the water pressure of the underground water that enters into the outer tube 4 through the collection port 42 of the outer tube 4, the inner tube assembly 1, which is in the state of being able to move within the outer tube 4, is pumped out by the water pressure and collected automatically. Alternatively, in the case where sufficient water pressure is not received, it is still possible to reliably recover the inner tube assembly 1 by pulling the inner tube assembly 1 out with the wire connected to the overshot.

The core barrel head 3, the inner tube assembly 1 and the inner tube recovery method according to the present embodiment as described in the foregoing can demonstrate following effects.

1. By simply pushing the latch disengagement slide tube 33 toward the front end side by the overshot, the inner tube assembly 1 is put in the state of being able to move within the outer tube 4.
2. When the front end side can receive sufficient water pressure from the underground water during recovery of the inner tube 2, the inner tube 2 can be recovered automatically.
3. When the overshot is pressed in, no water swivel is required. Instead, the outer tube 4 can be mounted on the geological sampling device and pressed in while being rotated.
4. The latch inclination preventing part 334 and the sliding tube biasing member 318 can prevent the inner fixing latch 32 from being unintentionally disengaged from the locking groove 43.

The core barrel head, the inner tube assembly provided with the same, and the inner tube recovery method according to the present invention are not limited to the embodiment disclosed, and may be modified as appropriate. For example, the latch disengagement slide tube 33 which is not connected to the latch inclination preventing part 334 may be shaped so as not to extend toward the front end side beyond the inner fixing latch 32.

REFERENCE SIGNS LIST

1 Inner tube assembly
2 Inner tube
3 Core barrel head
4 Outer tube
31 Main shaft
32 Inner fixing latch
33 Latch disengagement slide tube
34 Slide tube fixing latch
43 Locking groove
318 Sliding tube biasing member
323 Elastic material
334 Latch inclination preventing part
343 Elastic material

The invention claimed is:

1. A core barrel head that removably holds an inner tube at a front end position inside an outer tube in a geological sampling device configured to collect a geological sample, the core barrel head comprising:
 a main shaft connected to a rear end of the inner tube;
 an inner fixing latch that is axially supported at a substantially middle position along an axial direction of the main shaft and that is expanded outward of the main shaft by a biasing force of an elastic material so as to engage with a locking groove formed on an inner wall surface of the outer tube;
 a latch disengagement slide tube that is mounted to an outer circumferential surface of the main shaft slidably in the axial direction and that disengages the inner fixing latch from the locking groove by inclining the inner fixing latch against the biasing force when being slid in a front end direction of the main shaft; and
 a slide tube fixing latch that is axially supported at a rear end side of the main shaft and that is expanded outward of the main shaft by the biasing force of a second elastic material so as to lock the latch disengagement slide tube at a position where the inner fixing latch is in an expansion state, the slide tube fixing latch also being configured to disengage the lock of the latch disengagement slide tube by being inclined by an overshot that is pressed into the outer tube.

2. The core barrel head according to claim 1, wherein
the latch disengagement slide tube is integrally connected to a latch inclination preventing part that prevents inclination of the inner fixing latch,
the latch inclination preventing part prevents inclination of the inner fixing latch by coming into contact with an inner side of the inner fixing latch when the inner fixing latch is in the expansion state, and
the latch inclination preventing part moves in conjunction with a sliding motion of the latch disengagement slide tube in the front end direction so as to release the contact with the inner fixing latch when the inner fixing latch is inclined.

3. The core barrel head according to claim 1, comprising a sliding tube biasing member that biases the latch disengagement slide tube in a rear end direction with respect to the main shaft.

4. An inner tube assembly, comprising:
the core barrel head according to claim 1; and
an inner tube that is removably connected to a front end portion of the core barrel head.

5. A recovery method of an inner tube in which a geological sample has been collected, the method comprising:

a slide tube fixing latch release step of releasing an engaged state with a latch disengagement slide tube by pressing an overshot into an outer tube and inclining a slide tube fixing latch of a core barrel head at a front end position inside the outer tube;

a latch inclination preventing part release step of releasing a contact state of the latch inclination preventing part with an inner fixing latch by pushing the latch disengagement slide tube that is released from the engaged state toward a front end side and sliding the latch disengagement slide tube toward an axially front end side along an outer circumferential surface of a main shaft so as to move the latch inclination preventing part toward the axially front end side;

an inner fixing latch disengagement step of disengaging the inner fixing latch from a locking groove formed on an inner wall surface of the outer tube by inclining the inner fixing latch in an inward direction against a biasing force by the latch disengagement slide tube that is slid; and an inner tube recovery step of recovering the inner tube connected to a front end of the core barrel head by connecting the overshot to a rear end portion of the core barrel head and pumping the inner tube out by water pressure of underground water that enters into the outer tube, or by pulling the inner tube out with a wire connected to the overshot.

\* \* \* \* \*